Patented Dec. 2, 1952

2,620,335

UNITED STATES PATENT OFFICE 2,620,335

PROCESS OF EXTRACTION FROM IRISH MOSS

Ernst K. Nielsen, Lake Villa, and Nicholas R. Pellicani, Freeport, Ill., assignors to Kraft Foods Company, Chicago, Ill., a corporation of Delaware No Drawing. Application December 8, 1949, Serial No. 131,913

11 Claims. (Cl. 260—209)

The present invention relates, in general, to extracts of the sea plant known as Irish moss and, in particular, to an improved extract of Irish moss and to a method of producing the improved extract.

Irish moss is a sea plant known by the botanical names of Chondrus crispus or Gigartina mamillus or more commonly designated as carragheen, Perl moss, rock salt moss, and killeen pigwrack. Irish moss is harvested along the coast of the British Isles, northern Europe, New England, and Nova Scotia, and has been used for many years in the preparation of pharmaceuticals and food products.

Irish moss is usually employed in the form of a concentrate or extract which is obtained by leaching the useful materials from the moss with hot water, the leaching water then being separated from the solid residue and evaporated to form an extract. The heretofore known commercial Irish moss extracts have been characterized by fairly high viscosities and by gel forming properties in aqueous dispersions. For example, a one per cent aqueous dispersion of a typical commercial extract exhibits a viscosity of about 70 centipoises at 98° F. (measured by a Brookfield viscosimeter), this same material having a gel strength of from about 70–90 grams per square centimeter at 50° F. (measured by a modified Saare-Marten disk method).

The previously known Irish moss extracts have been used in the manufacture of various gels but their use has not been entirely satisfactory since the gels formed by the known extracts are rather weak. However, the use of Irish moss extract as a gelling agent in various food compositions, especially those which are to be heated, has been found desirable since the properties of Irish moss gels are not substantially affected by heating as are the gels of animal gelatine, etc. It has been known for some time that the addition of a potassium salt to an Irish moss extract will increase the strength of the gel formed by the extract. It has not been found feasible, however, to add a potassium salt and the extract to most food products since the addition of a potassium salt in large enough quantities to effectively enhance the gel producing properties of the extract usually changes the flavor and other characteristics of the product.

Accordingly, the principal object of this invention is the production of an Irish moss extract which exhibits high gel forming tendencies and which produces high viscosities in aqueous dispersions without requiring the addition of gel enhancing materials.

In the usual process for preparing Irish moss extract the moss which may or may not be dried is ground in a hammer mill and is placed in a large volume of water, e. g. about 200 pounds of moss to about 6000 pounds of water, and the mixture is cooked at about boiling temperature for about one hour. The vegetable fibers are then separated from the cooked mixture and the remaining liquid is then dried to produce the commercial Irish moss extract whose properties have been described. The drying may be effected by evaporating water from the liquid or by the usual alcohol extraction and drying procedure.

We have discovered that the viscosity and gel forming tendencies of the extract may be greatly increased by obtaining the extract from dried Irish moss which is soaked in an aqueous solution containing potassium ion prior to the step of cooking the moss in the extraction or leaching process, the potassium ion being supplied from a potassium salt. The gel strength of a 2 per cent dispersion of certain of the improved extracts made in accordance with the procedure of the invention may be as much as 400 per cent greater than the gel strengths of similar dispersions of an extract made by the conventional procedure. The viscosity of aqueous dispersions of the improved extract are also increased. Thus, the improved extract may be used in relatively small amounts to produce the gelling of various materials.

In general, Irish moss extracts which will produce aqueous dispersions having a high gel strength and a high viscosity may be made by soaking dried Irish moss, e. g. the so-called "black" or unbleached Irish moss or the bleached Irish moss of commerce, for a short period of time, e. g. about 15 minutes, in a dilute aqueous solution containing a potassium salt, draining the salt solution from the moss, adding water to the drained moss, cooking the moss with the added water to leach the valuable constituents therefrom, separating the cooking liquid from the fibrous materials, and removing the water from the liquid to produce an extract. Potassium salts, both organic and inorganic, may be employed in the process, e. g. potassium chloride, potassium carbonate, potassium iodide, potassium bicarbonate, potassium phosphate, potassium nitrate, potassium acetate, and potassium citrate. In the case of potassium chloride the dilute solution will desirably contain from about .5 to 10 per cent by weight of salt and generally the other salts are used in concentrations which supply potassium ion in an amount equivalent to that of .5 to 10 per cent by weight potassium chloride solution. However, alkaline salts such as potassium carbonate, potassium phosphate, etc., are ordinarily employed in lesser amounts than the more neutral salts since solutions of high pH value may have a detrimental effect upon the product. The optimum concentration for any one salt may be readily determined by preliminary experimental tests. In commercial operation, however, use of potassium chloride is preferred since this salt is the most readily available, is inexpensive, and, in addition, produces pronounced results on the moss being treated.

The properties of the extract may be enhanced by rinsing the dried moss in clear water prior to soaking in the salt solution, subsequent to soaking in the salt solution, or both before and after the soaking. A clear water rinse before the soaking tends to increase the viscosity of aqueous dispersions of the extract without materially affecting the gel strength of the extract. On the other hand, a clear water rinse after soaking produces a very uniform product which has a slightly lower gel strength than if this rinse had been omitted. When the preferred procedure of the invention is followed, i. e. rinsing the dried moss in water, soaking the rinsed moss for from about 15 minutes to 75 minutes in an aqueous solution of a potassium salt, draining the salt solution from the moss, suspending the drained moss in water and extracting the valuable constituents from moss in the usual manner, the viscosities of the extract are increased over those observed when a salt soak alone is employed. The extract produced by our improved process is bland and does not carry a perceptible amount of the taste of the potassium salt employed in the soaking step. Soaking the moss for prolonged periods in the salt solutions will also affect the properties of the extract but prolonged soaking periods show little or no advantage over soaks of from 15 to 75 minutes.

The following specific examples will serve to illustrate various procedures in accordance with this invention.

Example I

Irish moss sea plants which had previously been air dried, without bleaching, to produce the "black moss" of commerce, were passed through a hammer mill which comminuted the plant particles to about 10–20 mesh. The comminuted plant particles were then passed over a screen to remove the fines which consist primarily of sand, grit, broken-up mussel shells, and the like, which are present in the moss as harvested.

A portion of the cleaned moss weighing 1.375 pounds was suspended in 29 pounds of a two per cent, by weight, aqueous solution of potassium chloride. The moss was soaked in this salt solution for about one hour at room temperature (about 70° F.), and at the end of this period the salt solution was drained from the moss. Enough tap water was added to the drained moss to bring the total water present to about 50 pounds (fresh water plus the water retained by the moss from the salt solution cook). The mixture of moss and tap water was rapidly heated to 205° F. and was then cooked for 75 minutes at a temperature of between 200 and 205° F. At the end of the cooking period, about 3.5 pounds of diatomaceous earth filter aid was added to the hot cooked mixture which was then filtered while hot in a plate and frame filter press. A parting agent, glyceryl monolaurate, was added to the filtrate in amounts representing about 0.9 gram for each pound of filtrate. The filtrate was then dried on a roll drier to about six per cent moisture, the rolls on the drier being heated by saturated steam under a pressure of about 60 pounds per square inch. The dried filtrate comprised the extract.

A one gram portion of the extract prepared as described above was dispersed in 99 grams of water to produce a one per cent aqueous dispersion. The viscosity of this dispersion at 98° F., as measured by a Brookfield viscosimeter, was 325 centipoises. Another portion of the extract was dispersed in water to produce a two per cent aqueous dispersion, and this dispersion was tested for gel strength by the modified Saare-Martens disk method.

When determining the gel strength by the modified Saare-Martens disk method the two per cent aqueous dispersion, by weight, is heated to from 175–185° F. and poured into a wide mouthed container such as a beaker. A test surface having an area of one square centimeter and having a supporting hook attached thereto, is suspended in the dispersion. The dispersion in the container is then cooled and aged for about 12 hours. The container is then placed in a water bath held at 50° F. for one hour to temper the gel. The gel strength is then measured by the least number of grams required to break the test surface free from its position in the gel. The two per cent dispersion of the example had a gel strength of 238 grams per square centimeter.

Similar dispersions made from an extract of the same batch of dried moss produced under the conditions set forth above but with the omission of the step of soaking the moss in the salt solution prior to cooking, showed a viscosity of 72 centipoises and a gel strength of 129 grams per square centimeter.

Example II

Another 1.375 pound portion of the air dried moss of Example I was rinsed in 29 pounds of tap water at room temperature (about 70° F.) for about 5 minutes with occasional stirring and the rinse water was decanted. Enough two per cent, by weight, aqueous potassium chloride solution at room temperature (about 70° F.) was then added to the rinsed moss to bring the total amount of solution present to about 29 pounds (a total of the water absorbed by the moss and the salt solution present). The moss was soaked in this potassium chloride solution for one hour with occasional stirring, and when the one hour soak was completed, the potassium chloride solution was drained from the moss. Enough tap water was then added to the moss to bring the total weight of water to about 29 pounds, and the moss was stirred with this water for about 5 minutes to remove as much of the potassium chloride as possible. This water was then drained from the moss and enough fresh water was added to the moss to bring the total weight of water up to 50 pounds. This mixture was then heated rapidly to 205° F., was cooked, filtered, and dried in accordance with the procedure set forth in Example I.

A portion of the extract produced by the method of this example exhibited a viscosity of 815 centipoises (1 per cent dispersion) at 98° F. measured by a Brookfield viscosimeter, and a gel strength of 243 grams per square centimeter.

Example III

An extract produced in accordance with the procedure set forth in Example II except that the second rinsing step was omitted was dispersed in water to produce test dispersions. A one per cent dispersion exhibited a viscosity of 698 centipoises (98° F., Brookfield) and a two per cent dispersion had a gel strength of 417 grams per square centimeter.

*Example IV*

An extract was produced in accordance with the procedure set forth in Example I except that the potassium chloride solution was a 4 per cent solution, by weight. A one per cent aqueous test dispersion of the extract exhibited a viscosity of 770 centipoises (98° F. Brookfield) and a two per cent aqueous test dispersion had a gel strength of 319 grams.

*Example V*

An extract was produced in accordance with the procedure of Example II with the exception that the salt solution was a two per cent solution of potassium bicarbonate. A one per cent aqueous test dispersion of this extract exhibited a viscosity of 585 centipoises (98° F. Brookfield) and a two per cent aqueous dispersion had a gel strength of 201 grams per square centimeter.

It will be seen from an examination of the properties of the Irish moss extracts of the above specific examples that the viscosity and the gel forming tendencies of the moss extract are greatly increased by the potassium ion soak prior to the cooking operation. The Irish moss extract as produced in the above examples may be employed in dental adhesives, imitation pail jellies for baking, jellied fish, candy jellies, etc. The extract is substantially tasteless so that there is no change in the original taste of the food products.

The time of the salt soaking step may be varied to suit operating conditions. However, it will be found that the moss should be held at least about 15 minutes and preferably between about 30 and 60 minutes. Ordinarily, there is no advantage in holding the moss in the salt solution for over 60 minutes. In commercial operation, the moss is soaked between about 30 and about 60 minutes in a potassium chloride solution containing from 1–8 per cent, by weight, of potassium chloride. Optimum results are produced by a 60 minute soak with a 4 per cent potassium chloride solution.

The length of time required for the clear water rinses before and after the salt soak may be of substantially any duration. The rinse may constitute merely running fresh water over the moss, or the moss may be held in the rinse water for periods of as long as 30 minutes. However, extensive operations have shown that a 5 minute rinse both before and after a salt water soak improves the separation of the material from the final drying rolls and greatly enhances the properties of the finished product.

The temperatures at which the salt solution and the rinse water are maintained is not critical but soaking and rinsing temperatures of over about 95° F. decrease the yield of the extract in the leaching operation. Desirably, the rinsing and soaking are carried out at about room temperature or below.

The extracting or leaching procedures may be those normally employed in the manufacture of Irish moss extracts. The moss is suspended in from about 20 to 50 times its weight of water and the cooking temperatures and times may be varied considerably to suit manufacturing conditions. Normally, however, cooking times of from about 40 minutes to 120 minutes and temperatures in the range of from about 200 to 210° F. have been found satisfactory.

Various features of the invention which are believed to be new are set forth in the appended claims.

We claim:

1. The method of producing an extract of Irish moss which comprises the steps of soaking dried Irish moss sea plants in an aqueous solution of a potassium salt, the solution being substantially free of contaminating ions and the amount of potassium ion available in the solution being equivalent to that present in a 1 to 10 per cent, by weight, aqueous solution of potassium chloride, draining the solution from the moss, cooking the drained moss in fresh water to leach the valuable constituents from the moss, separating the liquid from the cooked moss, and removing water from the liquid to produce the extract.

2. The method of producing an extract of Irish moss which comprises the steps of soaking dried Irish moss sea plants in an aqueous solution of a potassium salt, the solution being substantially free of contaminating ions and the amount of potassium ion available in the solution being equivalent to that present in a 1 to 10 per cent, by weight, aqueous solution of potassium chloride, draining the solution from the moss, rinsing the drained moss in fresh water, cooking the rinsed moss in fresh water to leach the valuable constituents from the moss, separating the liquid from the cooked moss, and removing water from the liquid to produce the extract.

3. The method of producing an extract of Irish moss which comprises the steps of rinsing dried Irish moss sea plants in fresh water, soaking the rinsed Irish moss in an aqueous solution of a potassium salt, the solution being substantially free of contaminating ions and the amount of potassium ion available in the solution being equivalent to that present in a 1 to 10 per cent, by weight, aqueous solution of potassium chloride, draining the solution from the moss, cooking the drained moss in fresh water to leach the valuable constituents from the moss, separating the liquid from the cooked moss, and removing water from the liquid to produce the extract.

4. The method of producing an extract of Irish moss which comprises the steps of rinsing dried Irish moss sea plants in fresh water, soaking the Irish moss in an aqueous solution of a potassium salt, the solution being substantially free of contaminating ions, and containing an amount of potassium ion which is equivalent to that present in a 1 to 10 per cent, by weight, aqueous solution of potassium chloride, draining the solution from the moss, rinsing the drained moss in fresh water, cooking the rinsed moss in water to leach the valuable constituents from the moss, separating the liquid from the cooked moss, and removing water from the liquid to produce the extract.

5. The method of producing an extract of Irish moss which comprises the steps of soaking dried Irish moss sea plants in an aqueous solution of a potassium salt for over about 15 minutes, the amount of potassium ion available in the salt solution being equivalent to that present in a 1 to 10 per cent, by weight, aqueous solution of potassium chloride, draining the salt solution from the moss, cooking the drained moss in fresh water to leach the valuable constituents from the moss, separating the liquid from the cooked moss, and drying the liquid to produce the extract.

6. The method of producing an extract of Irish moss which comprises the steps of rinsing dried Irish moss sea plants in fresh water, soaking the rinsed Irish moss in an aqueous solution of a potassium salt for over about 15 minutes, the amount of potassium ion available in the salt solution being equivalent to that present in a 1 to 10 per cent, by weight, aqueous solution of potassium chloride, draining the salt solution from the moss, cooking the drained moss in fresh water to leach the valuable constituents from the moss, separating the liquid from the cooked moss, and drying the liquid to produce the extract.

7. The method of producing an extract of Irish moss which comprises the steps of soaking dried Irish moss sea plants in an aqueous solution of a potassium salt for from about 15 to about 75 minutes at a temperature of less than about 95° F., the amount of potassium ion available in the salt solution being equivalent to that present in a 1 to 10 per cent, by weight, aqueous solution of potassium chloride, draining the salt solution from the moss, cooking the drained moss in fresh water to leach the valuable constituents from the moss, separating the liquid from the cooked moss, and drying the liquid to produce the extract.

8. The method of producing an extract of Irish moss which comprises the steps of rinsing dried Irish moss sea plants in fresh water at a temperature of less than about 95° F., suspending the rinsed Irish moss in an aqueous solution of a potassium salt for from between about 15 to 75 minutes at a temperature of less than about 95° F., the amount of potassium ion available in the salt solution being equivalent to that present in a 1 to 10 per cent, by weight, aqueous solution of potassium chloride, draining the salt solution from the moss, cooking the drained moss in fresh water to leach the valuable constituents from the moss, separating the liquid from the cooked moss, and drying the liquid to produce the extract.

9. The process of claim 7 wherein the potassium salt is potassium chloride.

10. The process of claim 8 wherein the potassium salt is potassium chloride.

11. The method of producing an extract of Irish moss which comprises the steps of rinsing dried Irish moss sea plants in fresh water at a temperature of less than about 95° F., soaking the rinsed Irish moss in a 4 per cent, by weight, aqueous solution of potassium chloride for about 60 minutes at a temperature of less than about 95° F., separating the soaked moss from the salt solution, cooking the moss in fresh water to leach the valuable constituents from the moss, separating the liquid from the cooked moss, and drying the liquid to produce the extract.

ERNST K. NIELSEN.
NICHOLAS R. PELLICANI.

REFERENCES CITED

The following references are of record in the file of this patent:

Mantell, "The Water-Soluble Gums," 1947, pages 100–104, 5 pages.